United States Patent
Schley-May et al.

(10) Patent No.: US 8,472,532 B2
(45) Date of Patent: Jun. 25, 2013

(54) METHOD AND APPARATUS FOR GENERATING A COMMON-MODE REFERENCE SIGNAL

(75) Inventors: James T. Schley-May, Nevada City, CA (US); Richard Barry Angell, Nevada City, CA (US)

(73) Assignee: 2Wire, Inc., San Jose, CA (US)

( * ) Notice: Subject to any disclaimer, the term of this patent is extended or adjusted under 35 U.S.C. 154(b) by 1171 days.

(21) Appl. No.: 12/290,546

(22) Filed: Oct. 30, 2008

(65) Prior Publication Data

US 2010/0111202 A1    May 6, 2010

(51) Int. Cl.
*H04B 3/00*     (2006.01)
*H04L 25/00*    (2006.01)

(52) U.S. Cl.
USPC ........... 375/258; 375/257; 375/346; 375/349; 375/350

(58) Field of Classification Search
USPC .................. 375/219–223, 257–258, 316–318, 375/340, 346, 349–350
See application file for complete search history.

(56) References Cited

U.S. PATENT DOCUMENTS

| | | | | |
|---|---|---|---|---|
| 4,277,655 | A | * | 7/1981 | Surprenant .................. 379/340 |
| 5,382,875 | A | * | 1/1995 | Grocki et al. ..................... 315/8 |
| 6,459,739 | B1 | * | 10/2002 | Vitenberg ..................... 375/258 |
| 2010/0033165 | A1 | * | 2/2010 | Rostamzadeh et al. ....... 324/127 |

FOREIGN PATENT DOCUMENTS

WO     WO 97/40587     10/1997

* cited by examiner

*Primary Examiner* — Chieh M Fan
*Assistant Examiner* — James M Perez
(74) *Attorney, Agent, or Firm* — Head, Johnson & Kachigian, P.C.

(57) ABSTRACT

A method and apparatus to generate a common-mode reference signal. A common-mode current is received at a common-mode current sensing circuit. The common-mode current is sampled at a node between the common-mode current sensing circuit and a shunt resistor. The resulting voltage across the shunt resistor from the applied common-mode current is used as a common-mode reference signal.

8 Claims, 12 Drawing Sheets

"PRIOR ART"

METHOD AND APPARATUS FOR GENERATING A COMMON-MODE REFERENCE SIGNAL

TECHNICAL FIELD

This invention relates to the field of telecommunications systems and, in particular, to common-mode noise cancellation in a telecommunications system.

BACKGROUND

Many modern communications systems employ a twisted wire pair using differential signaling to transmit data. Among the communications systems in this category are telecommunications systems such as the various types of Digital Subscriber Line (xDSL), and other digital carrier systems. xDSL may include, for example, asymmetric digital subscriber line (ADSL), asymmetric digital subscriber line two plus (ADSL2+) and very high-speed digital subscriber line (VDSL) systems.

In ADSL2+ modems with a frequency range of 138 kilohertz (KHz) to 2.2 megahertz (MHz), the signal-to-noise ratio (SNR) is often degraded by the presence of radio and other unwanted signals that are inadvertently picked up by the system. In particular, AM radio signals in the range of 540 KHz to 1.6 MHz may cause significant interference. In VDSL modems, with an upper frequency of 12 MHz to 17 MHz, there are even more disturber sources that can corrupt the SNR.

These unwanted signals are impressed on the twisted pair line as a common-mode signal with respect to ground. In conventional xDSL modems, receivers are designed to accept differential signals and reject common mode signals. The modems typically include a common mode filter to reject a substantial portion of the common mode signal. Depending on the quality and balance of the twisted pair line, some portion of the common-mode signal may be converted to a differential signal in the line itself. Under typical conditions, this portion may be enough to limit system performance.

Once converted to a differential signal by any means, the disturber signal appears as noise mixed with the intended communication signal and this effectively degrades the SNR and hence the data throughput performance of the modem. If the common-mode noise signal Y is known independently of the signal X+Y that contains both noise signal Y and differential communication signal X, then it is possible for the modem, using digital signal processing (DSP) means, to subtract the signal Y from the signal X+Y and be left with just the signal X. In other words, it is possible to uncover the intended communication signal in the presence of the common-mode noise signal.

In order to support DSP cancellation of the common-mode signals in an xDSL modem, two additional functional blocks are required in hardware: (1) a second receiver input containing an analog-to-digital converter (ADC); and (2) a circuit to generate a common-mode reference signal which contains substantially only the common-mode content of the line.

Figure 1:
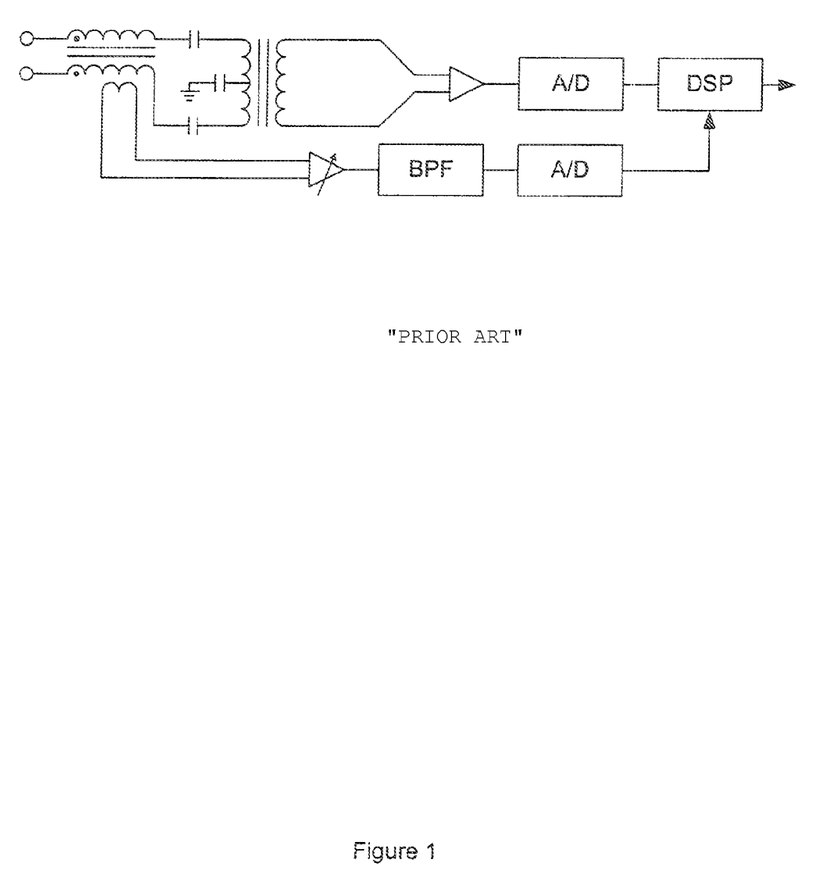
FIG. 1 illustrates a conventional common-mode reference signal generation circuit.

FIG. 1 illustrates a conventional common-mode reference signal generation circuit. In FIG. 1, the noise estimate is based on a common-mode reference noise signal, which is sampled via an additional winding on the magnetic core of the common mode filter inductor that couples the input lines to the receiver. Existing communication standards require that the primary winding or windings of the line transformer or filter inductor be isolated from chassis ground and from the secondary winding. A common-mode reference signal detector must span and yet provide galvanic isolation between the telecom network voltage (TNV) circuitry and the safe effective low voltage (SELV) circuitry. The breakdown voltage of this isolation must be at least 1500 volts of alternating current (VAC). Therefore, a common-mode reference noise signal, either from the center tap of the primary winding of the line coupling transformer or from an additional winding on the common mode filter inductor (as shown in FIG. 1) cannot be connected directly to the radio frequency (RF) noise canceller. Isolation by means of and an additional and more costly high-voltage transformer is required.

BRIEF DESCRIPTION OF THE DRAWINGS

The present invention is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to generate a common-mode reference signal. In one embodiment, a common-mode current is received at a common-mode current sensing circuit. The common-mode current is then sampled at a node between the common-mode filter source and a shunt resistor. The resulting voltage across the shunt resistor from the applied common-mode current is used as a common-mode reference signal.

Figure 2A:
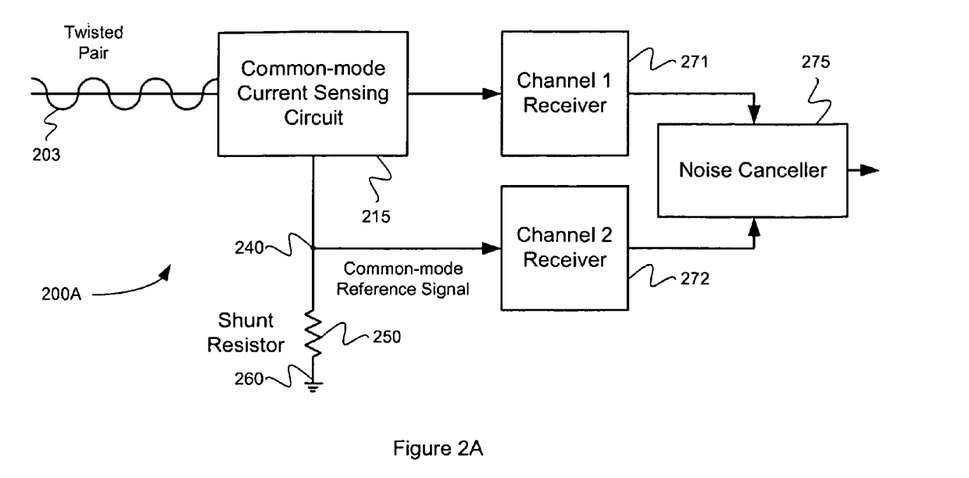
FIG. 2A illustrates a block diagram of a common-mode reference signal generation circuit according to one embodiment of the present invention.

FIG. 2A illustrates a block diagram of a common-mode reference signal generation circuit according to one embodiment of the present invention. Circuit 200A includes twisted pair 203, common-mode current sensing circuit 215, output node 240, shunt resistor 250, low supply node 260, receivers 271 and 272 and noise canceller 275. Common-mode current sensing circuit 215 is coupled to twisted pair 203 and is configured to receive a common-mode current. As will be discussed below, common-mode current sensing circuit 215 may receive the common-mode current directly from the twisted pair 203 or from the center tap of a transformer (not shown). The common-mode current sensing circuit 215 draws the common-mode current and provides it to output node 240. The common-mode current is applied to shunt resistor 250 which is coupled between output node 240 and a low supply node 260. The resulting voltage at output node 240 is used as a common-mode reference signal.

The first receiver 271 receives the combined differential and common-mode signal from twisted pair 203. The common-mode reference signal at output node 240 is applied to a second receiver 272. Receivers 271 and 272 provide their respective signals to noise canceller 275. At noise canceller 275, the common-mode reference signal is subtracted from the combined signal. The output of noise canceller 275 is the differential signal containing the communication data with minimal interference from the common-mode noise signal.

Figure 2B:
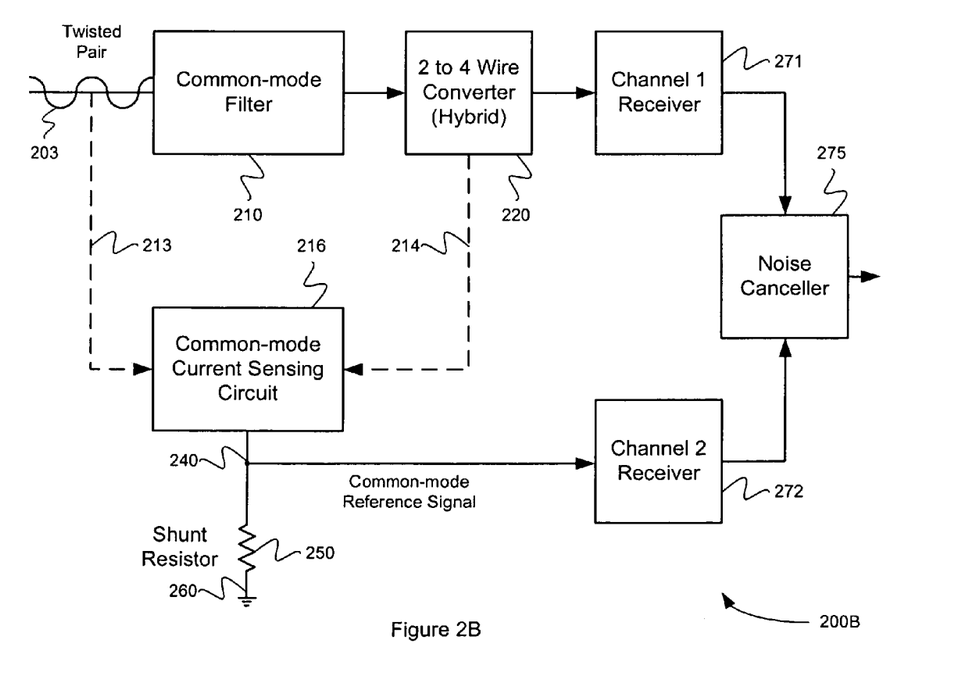
FIG. 2B illustrates a block diagram of a common-mode reference signal generation circuit according to one embodiment of the present invention.

FIG. 2B illustrates a block diagram of a common-mode reference signal generation circuit according to one embodiment of the present invention. In circuit 200B twisted pair 203 contains both differential data signals and common-mode noise signals attributable to interference sources which radiate onto twisted pair 203 resulting in the noise signals. For example, the interference sources may be AM radio waves in the range of 540 KHz to 1.6 MHz. Alternatively, the interference may be caused by other sources. In one embodiment, the signals from twisted pair 203 are applied to common-mode filter 210. Common-mode filter 210 serves to filter out the common-mode noise, however, common-mode noise filter 210 may not remove all common-mode noise. The remaining noise signals are provided to 2 to 4 wire converter 220. In one embodiment converter 220 is a transformer having a center tap on an input side. The center tap is coupled to common-mode current sensing circuit 216 via connection 214. In this embodiment, connection 213 is not present. In an alternative embodiment, twisted pair 203 provides the common-mode current directly to common-mode current sensing circuit 216 via connection 213. In this alternative embodiment, connection 214 is not present.

In either embodiment, common-mode current sensing circuit provides the common-mode current to output node 240. The common-mode current is applied to shunt resistor 250 which is coupled between output node 240 and a low supply node 260. The resulting voltage at output node 240 is used as a common-mode reference signal which is provided to receiver 272. Receiver 271 receives the combined differential and common-mode signal from twisted pair 203. Receivers 271 and 272 provide their respective signals to noise canceller 275. In one embodiment receivers 271 and 272 are differential receivers each having two inputs. Receiver 271 is coupled to and receives two outputs from 2 to 4 wire converter 220. Receiver 272 has one input coupled to output node 240 and a second input coupled to ground. In an alternative embodiment, the second input of receiver 272 is coupled to ground through a DC blocking capacitor. In alternative embodiments, the inputs of receivers 271 and 272 are connected in other ways. At noise canceller 275, the common-mode reference signal is subtracted from the combined signal. The output of noise canceller 275 is the differential signal containing the communication data with minimal interference from the common-mode noise signal.

Figure 3:
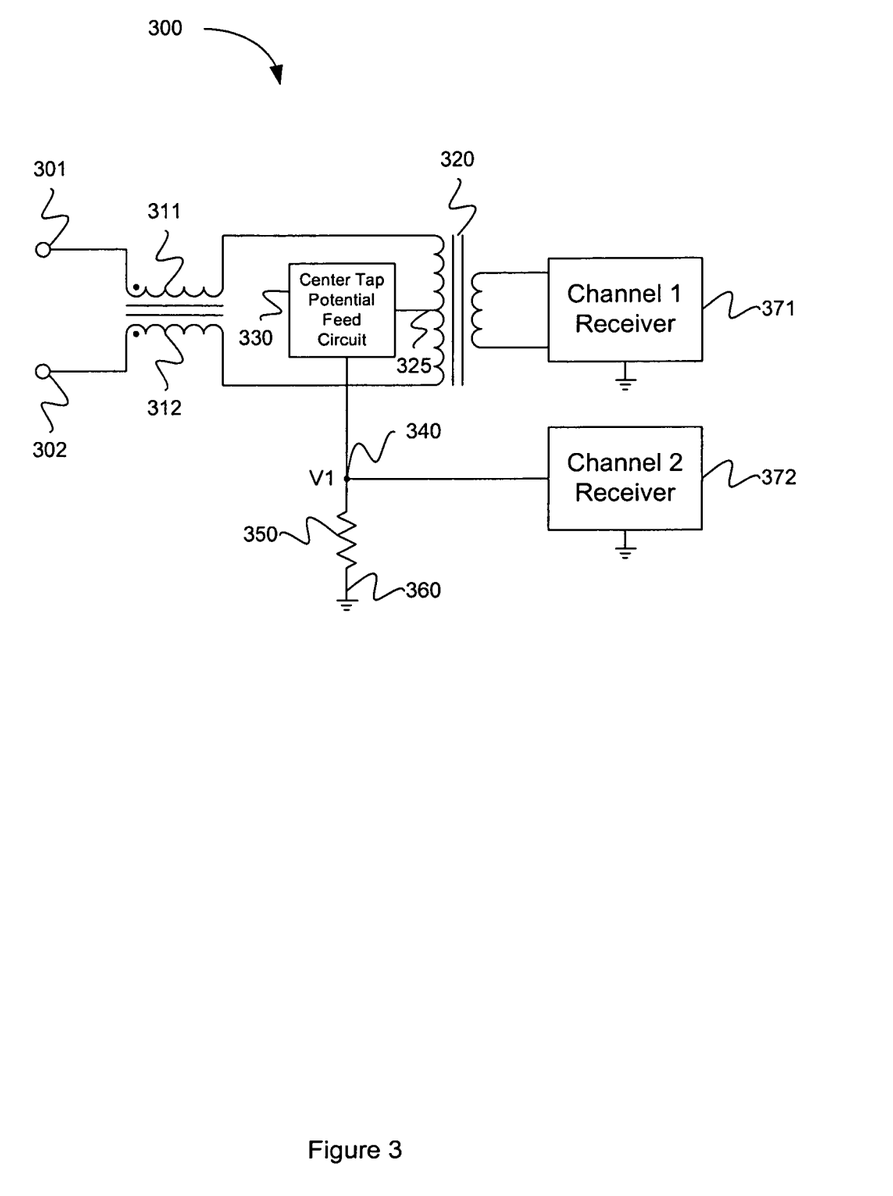
FIG. 3 illustrates a schematic block diagram of a common-mode reference signal generation circuit according to one embodiment of the present invention.

FIG. 3 illustrates a schematic block diagram of a common-mode reference signal generation circuit according to one embodiment of the present invention. In this embodiment, circuit 300 includes input lines 301 and 302, series windings 311 and 312, transformer 320, center tap potential feed circuit 330, output node 340, shunt resistor 350, low supply node 360 and receivers 371 and 372. The first series winding 311 is coupled to the first input line 301 and is configured to receive a first input signal. The second series winding 312 is coupled to the second input line 302 and is configured to receive a second signal. At the end opposite the first input line 301, the first series winding 311 is coupled to one end of an input winding of transformer 320. Similarly, the second series winding 312 is coupled to a second end of the input winding of transformer 320. In one embodiment, series windings 311 and 312 are two windings on a common core, wired in an arrangement that generates a magnetic field only to common-mode signals, where one is in series with each of the incoming lines. An output winding of transformer 320 is coupled to a first receiver 371.

In this embodiment, the common-mode current is obtained from transformer 320 through center tap 325. Center tap potential feed circuit 330 is coupled to center tap 325 and receives the common-mode current. The output of center tap potential feed circuit 330 is coupled to output node 340. Output node 340 is further coupled to a low supply node 360 through shunt resistor 350. In this embodiment, low supply node 360 has a ground potential and shunt resistor 350 has a resistance in approximately a range of 10 ohms to 500 ohms. In alternative embodiments shunt resistor 350 has some other resistance value. In other alternative embodiments, low supply node 360 has some other low potential value. Also connected to output node 340 is a second receiver 372. Both the first receiver 371 and the second receiver 372 are referenced to ground.

A common-mode current is obtained from center tap 325 and filtered through center tap potential feed circuit 330. At output node 340, the voltage across shunt resistor 350 from the applied filtered common-mode current is sampled and provided to the second receiver 372. The voltage V1 at output node 340 is used as a common-mode reference signal.

The first receiver 371 receives the combined differential and common-mode signal from the output winding of transformer 320. The common-mode reference signal received at the second receiver 372 can then be subtracted from the combined signal using DSP circuitry, as discussed above. The resulting signal is the differential signal containing only the communication data with minimal interference from the common-mode noise signal.

Figure 4:
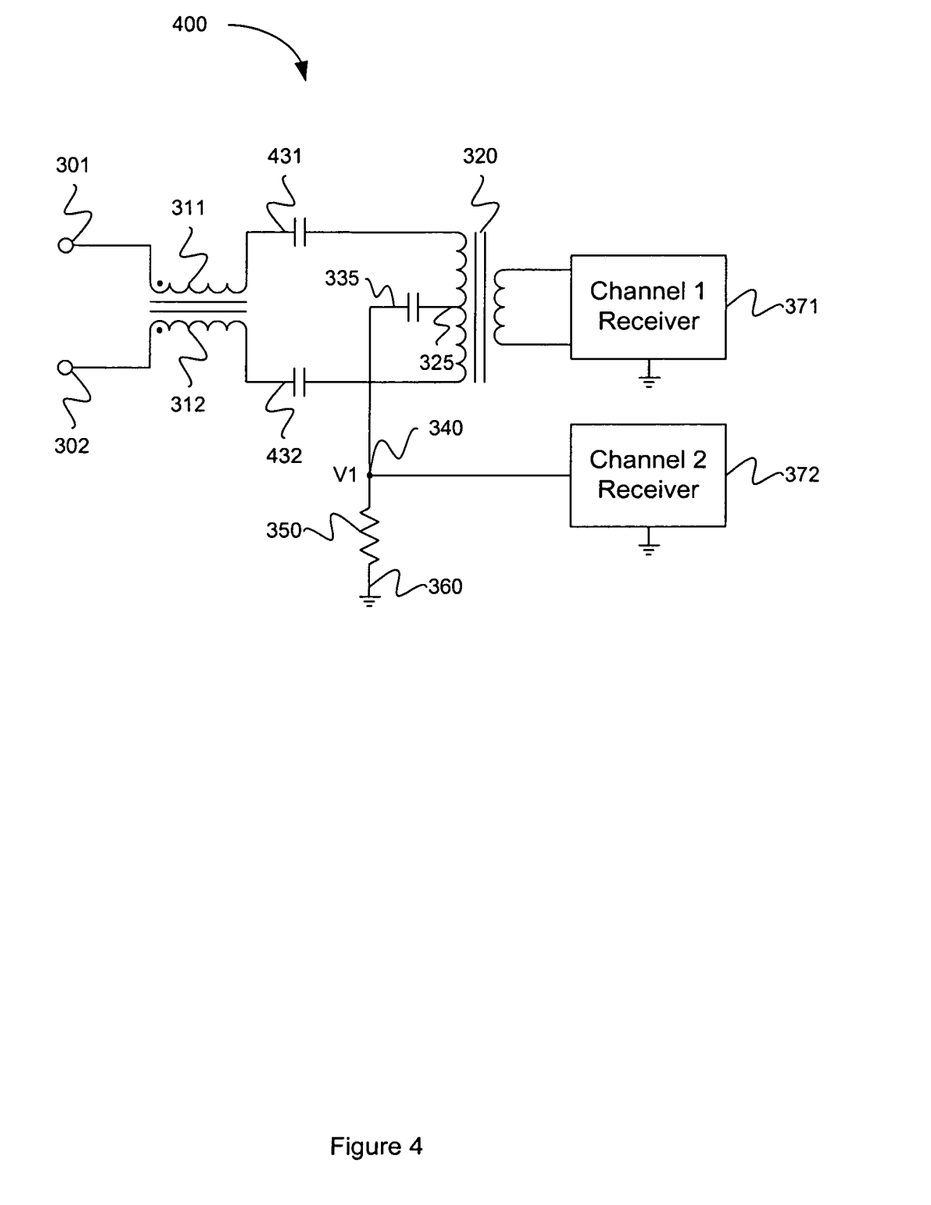
FIG. 4 illustrates a schematic diagram of a common-mode reference signal generation circuit according to one embodiment of the present invention.

FIG. 4 illustrates a schematic diagram of a common-mode reference signal generation circuit according to one embodiment of the present invention. Circuit 400 is substantially similar to circuit 300 of FIG. 3 with the addition of direct current (DC) blocking capacitors 431 and 432 and center tap capacitor 435 in place of center tap potential feed circuit 330. The first DC blocking capacitor 431 is coupled between the first series winding 311 and the input winding of transformer 320. Similarly, the second DC blocking capacitor 432 is coupled between the second series winding 312 and the input winding of transformer 320. The center tap capacitor 435 is coupled between center tap 325 and output node 340.

Series windings 311 and 312 together with center tap capacitor 435 and shunt resistor 350 form a low-pass filter that attenuates common-mode energy to the input winding of transformer 320. Center tap capacitor 435 has a construction that meets the safety isolation requirements for communication systems. In one embodiment, center tap capacitor 435 has a capacitance value in approximately a range of 1 nanofarad (nF) to 10 nF. In an alternative embodiment, center tap capacitor 435 has some other capacitance value. As a result, when the common-mode current is sampled across shunt resistor 350 on the low voltage side of center tap capacitor 435, no additional high voltage isolation transformer is necessary. Additionally, the resistance value of shunt resistor 350 is low enough to keep the combination of series windings 311 and 312 and center tap capacitor 435 functioning as an effective common-mode filter with at least approximately 30 decibels (dB) of rejection. For example, shunt resistor 350 may have a value in approximately a range of 10 ohms to 500 ohms. This maintains the necessary filtering on the input side of transformer 320. Finally, as a result of common-mode impedance from center tap capacitor 435, the filtered common-mode current will be frequency dependent and any common-mode current surges will be greatly attenuated at output node 340, thus protecting the second receiver 372 from saturation.

Figure 5:
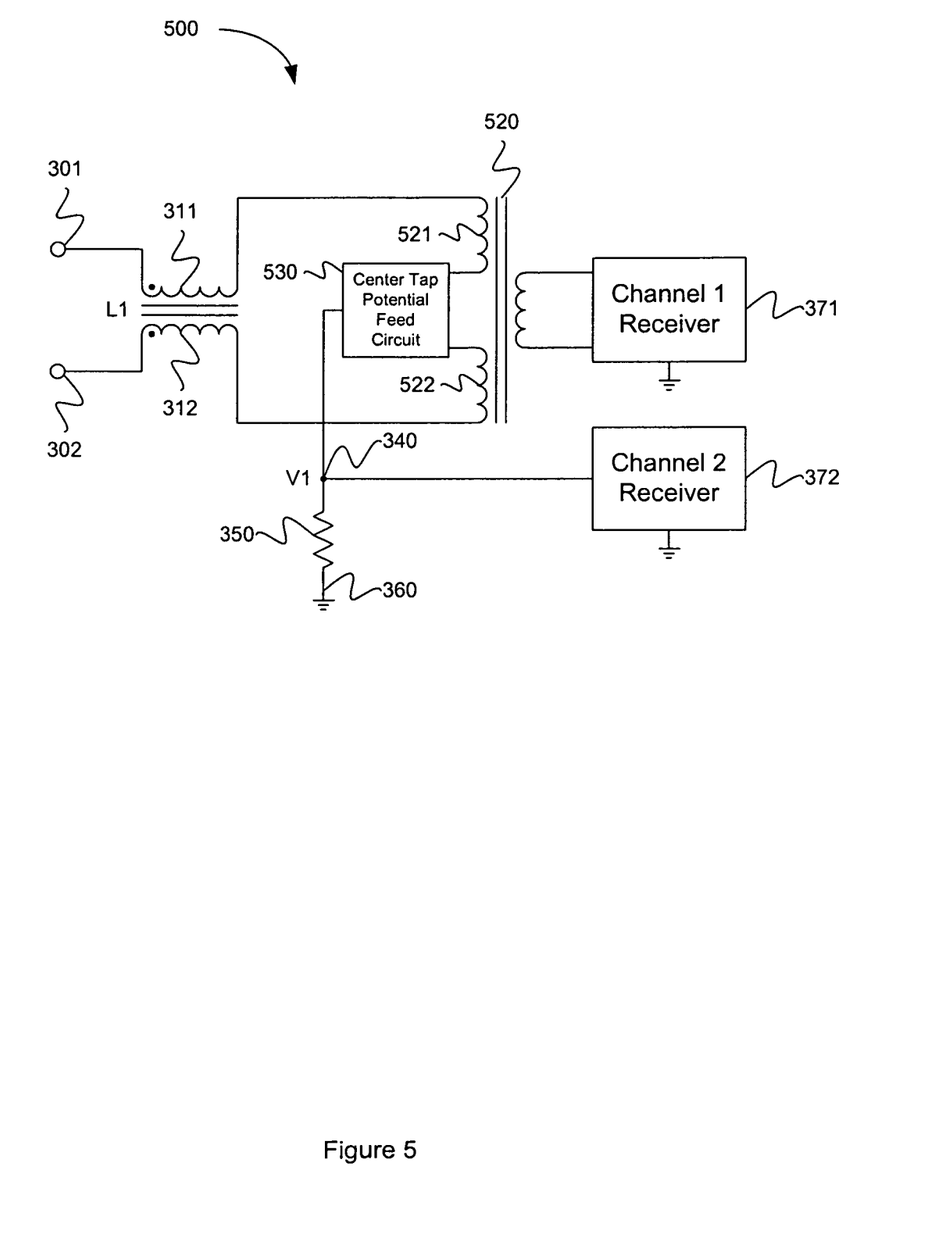
FIG. 5 illustrates a schematic block diagram of a common-mode reference signal generation circuit according to one embodiment of the present invention.

FIG. 5 illustrates a schematic block diagram of a common-mode reference signal generation circuit according to one embodiment of the present invention. Circuit 500 is substantially similar to circuit 300 of FIG. 3 except that center tap potential feed circuit 530 is coupled between a first primary winding 521 and a second primary winding 522 on an input side of transformer 520. An output of center tap potential feed circuit 530 is coupled to output node 340.

The functionality of circuit 500 is similar to that of circuit 300 of FIG. 3 as well. A common-mode current is obtained from primary windings 521 and 522 of transformer 520 and received by center tap potential feed circuit 530. At output node 340, the voltage across shunt resistor 350 from the applied filtered common-mode current is sampled and provided to the second receiver 372. The voltage V1 at output node 340 is used as a common-mode reference signal.

Figure 6:
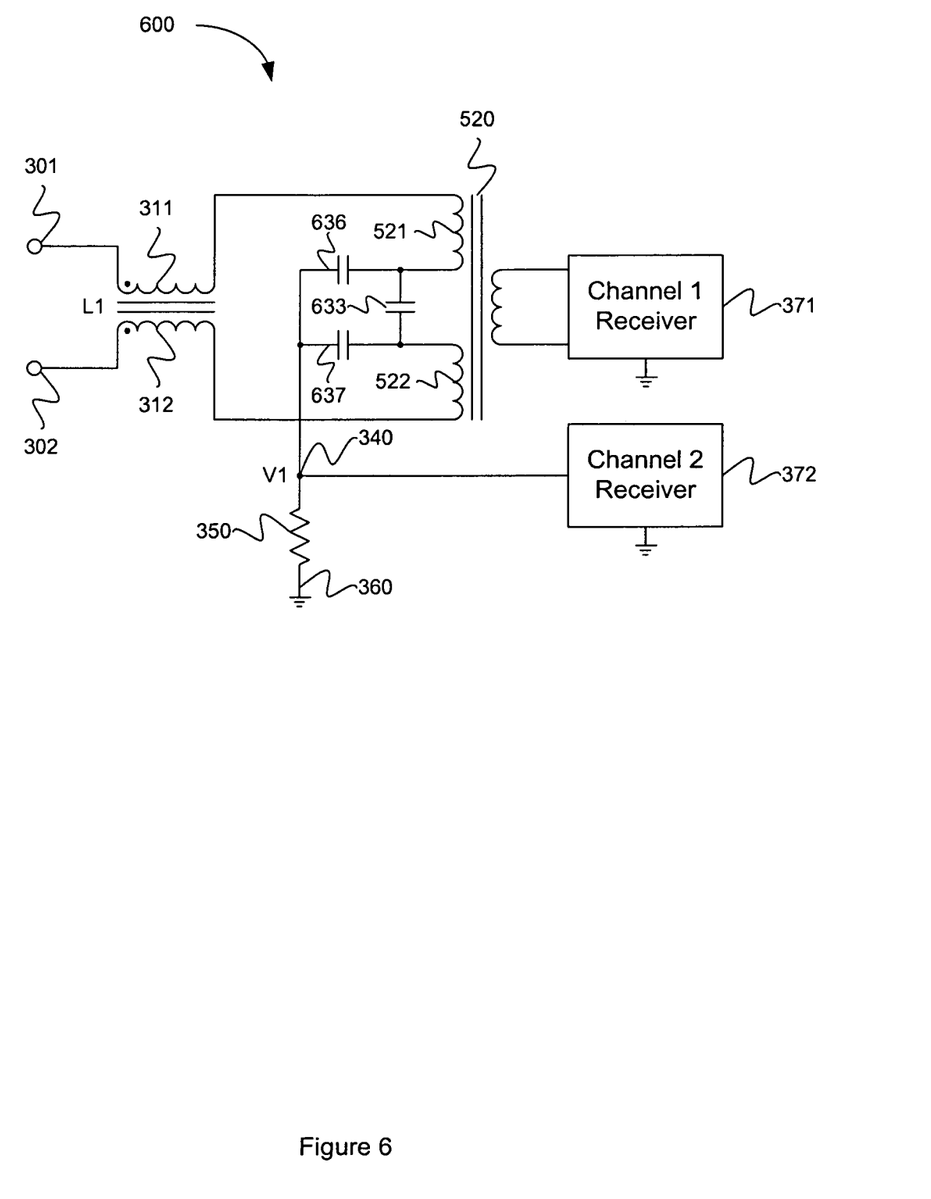
FIG. 6 illustrates a schematic diagram of a common-mode reference signal generation circuit according to one embodiment of the present invention.

FIG. 6 illustrates a schematic diagram of a common-mode reference signal generation circuit according to one embodiment of the present invention. Circuit 600 is substantially similar to circuit 500 of FIG. 5 except that DC blocking capacitor 633 and center tap capacitors 636 and 637 have replaced center tap potential feed circuit 530. DC blocking capacitor 633 is coupled between the first primary winding 521 and the second primary winding 522 of transformer 520. Center tap capacitor 636 is coupled between the first primary winding 521 and output node 340 and center tap capacitor 637 is coupled between the second primary winding 522 and output node 340.

Center tap capacitors 637 and 638 operate to ground the electrical center of transformer 520. In one embodiment center tap capacitors 637 and 638 are equal and have a capacitance value in approximately a range of 500 picofarads (pF) to 5 nF. In alternative embodiments, center tap capacitors 637 and 638 have other values. In this embodiment, DC blocking capacitor 633 has a large capacitance value with respect to that of center tap capacitors 637 and 638 and is in approximately a range of 15 nF to 68 nF. In alternative embodiments, DC blocking capacitor 633 has some other value.

In this embodiment, the common-mode current is filtered by center tap capacitors 637 and 638. The filtered common-mode current is then applied to shunt resistor 350 and the voltage at output node 340 is sampled. The voltage signal V1 at output node 340 is provided to the second receiver 372 as described above with respect to FIG. 3.

Figure 7:
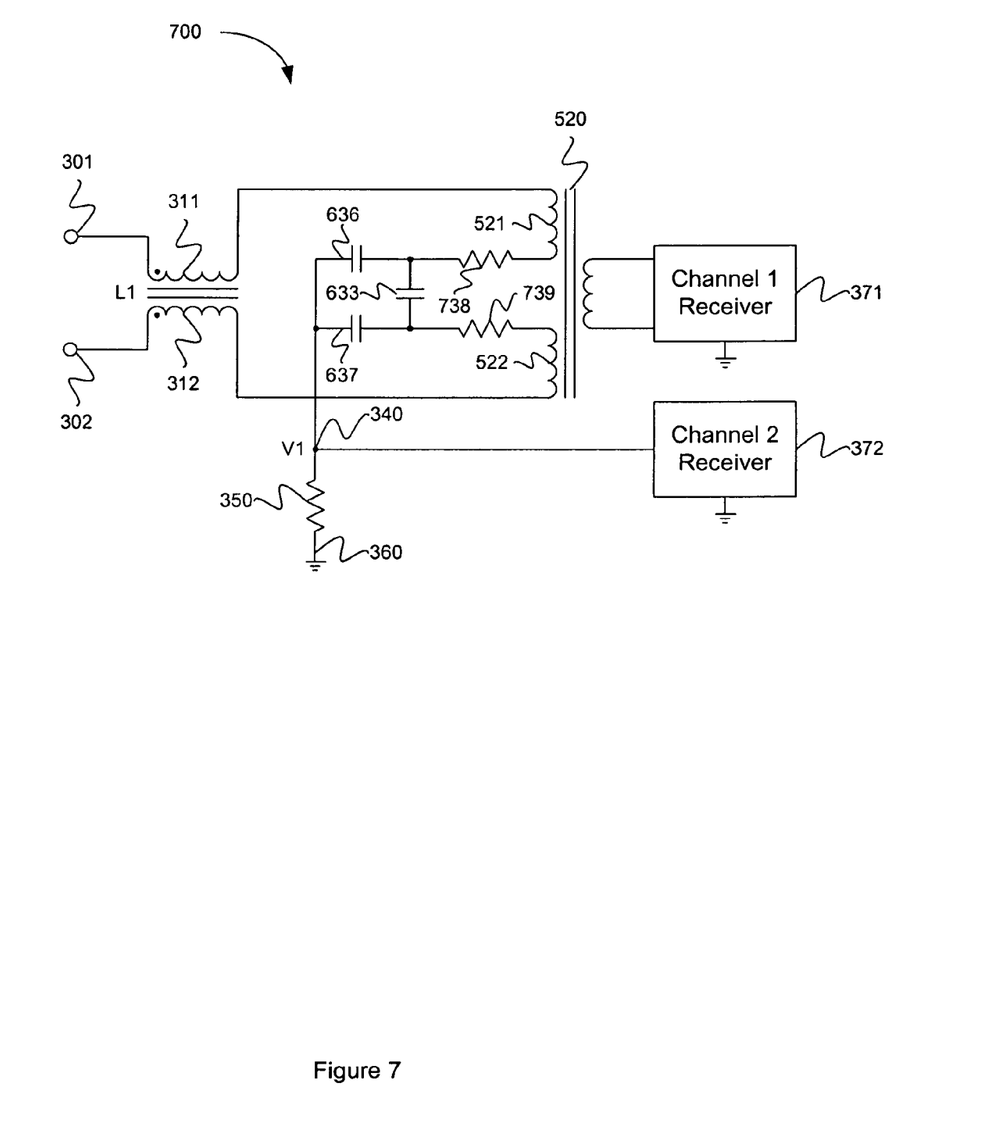
FIG. 7 illustrates a schematic diagram of a common-mode reference signal generation circuit according to one embodiment of the present invention.

FIG. 7 illustrates a schematic diagram of a common-mode reference signal generation circuit according to one embodiment of the present invention. Circuit 700 is substantially similar to circuit 600 of FIG. 6 with the addition of differential impedance matching resistors 738 and 739. A first differential impedance matching resistor 738 is coupled between the first primary winding 521 and the first center tap capacitor 636. A second differential impedance matching resistor 739 is coupled between the second primary winding 522 and the second center tap capacitor 637. In one embodiment, impedance matching resistors 738 and 739 have resistance values in approximately a range of 40 to 60 ohms. In alternative embodiments, impedance matching resistors have other values.

In an alternative embodiment, the differential impedance matching resistors are located on the output side of transformer 520. In either embodiment, the function of the circuit is the same. The filtered common mode current is applied to shunt resistor 350 and the voltage at output node 340 is sampled. The voltage signal V1 at output node 340 is provided to the second receiver 372.

Figure 8:
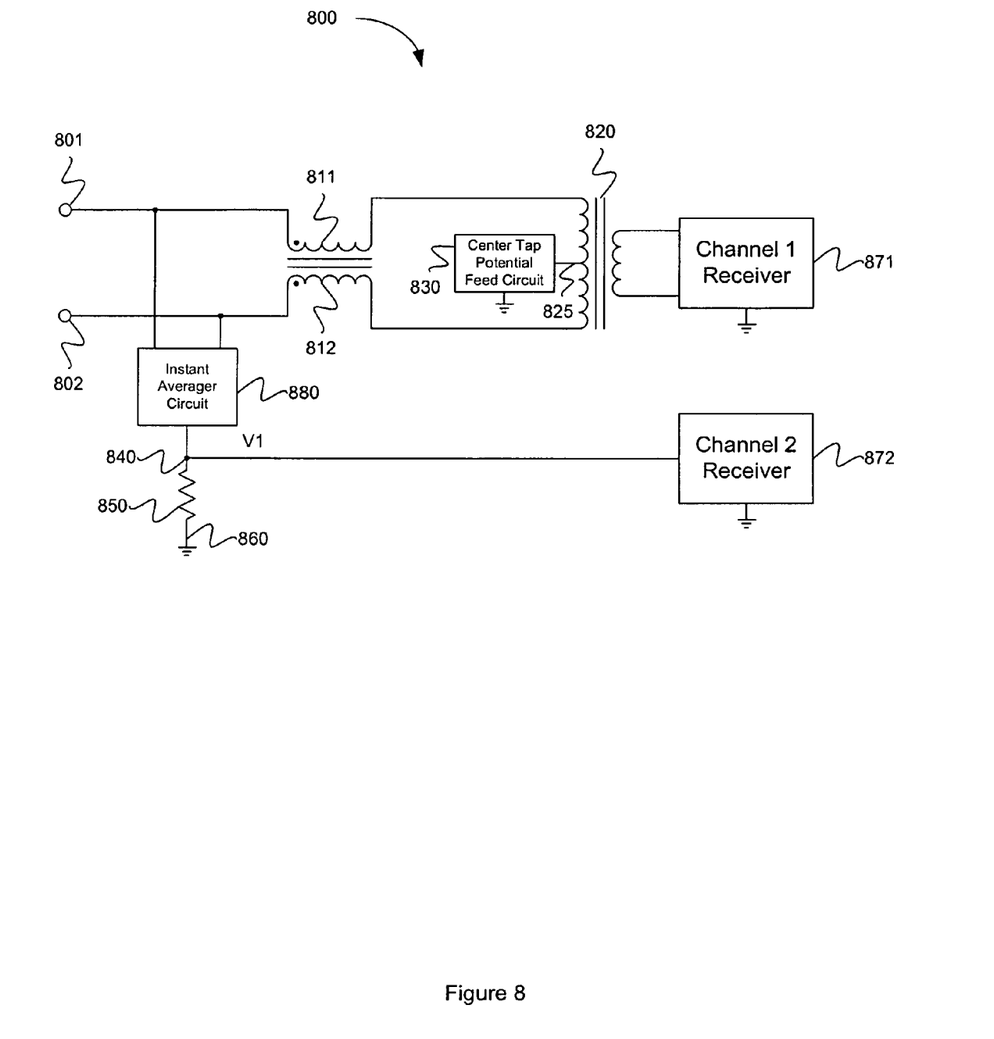
FIG. 8 illustrates a schematic block diagram of a common-mode reference signal generation circuit according to one embodiment of the present invention.

FIG. 8 illustrates a schematic block diagram of a common-mode reference signal generation circuit according to one embodiment of the present invention. In this embodiment, circuit 800 includes input lines 801 and 802, series windings 811 and 812, transformer 820, center tap potential feed circuit 830, output node 840, shunt resistor 850, low supply node 860, receivers 871 and 872 and instant averager circuit 880. The first series winding 811 is coupled to the first input line 801 and is configured to receive a first input signal. The second series winding 812 is coupled to the second input line 802 and is configured to receive a second signal. At the end opposite the first input line 801, the first series winding 811 is coupled to one end of an input winding of transformer 820. Similarly, the second series winding 812 is coupled to a second end of the input winding of transformer 820. An output winding of transformer 820 is coupled to a first receiver 871. Center tap potential feed circuit 830 is coupled between center tap 825 on the input side of transformer 830 and a low supply node.

In this embodiment, the common-mode current is received directly from signal lines 801 and 802. Instant averager circuit 880 is coupled to the first signal line 801 and the second signal line 802 and receives a portion of the common-mode current. The output of instant averager circuit 880 is coupled to output node 840. Output node 840 is further coupled to a low supply node 860 through shunt resistor 850. In this embodiment, low supply node 860 has a ground potential. In alternative embodiments, low supply node 860 has some other low potential value. Also connected to output node 840 is a second receiver 872. Both the first receiver 871 and the second receiver 872 are referenced to ground.

A common-mode current is obtained from input lines 801 and 802 and filtered through instant averager circuit 880. At output node 840, the voltage across shunt resistor 850 from the applied filtered common-mode current is sampled and provided to the second receiver 872. The voltage V1 at output node 840 is used as a common-mode reference signal.

The first receiver 871 receives the combined differential and common-mode signal from the output winding of transformer 820. The common-mode reference signal received at the second receiver 872 can be subtracted from the combined signal using DSP circuitry. The resulting signal is the differential signal containing only the communication data with minimal interference from the common-mode noise signal.

Figure 9:
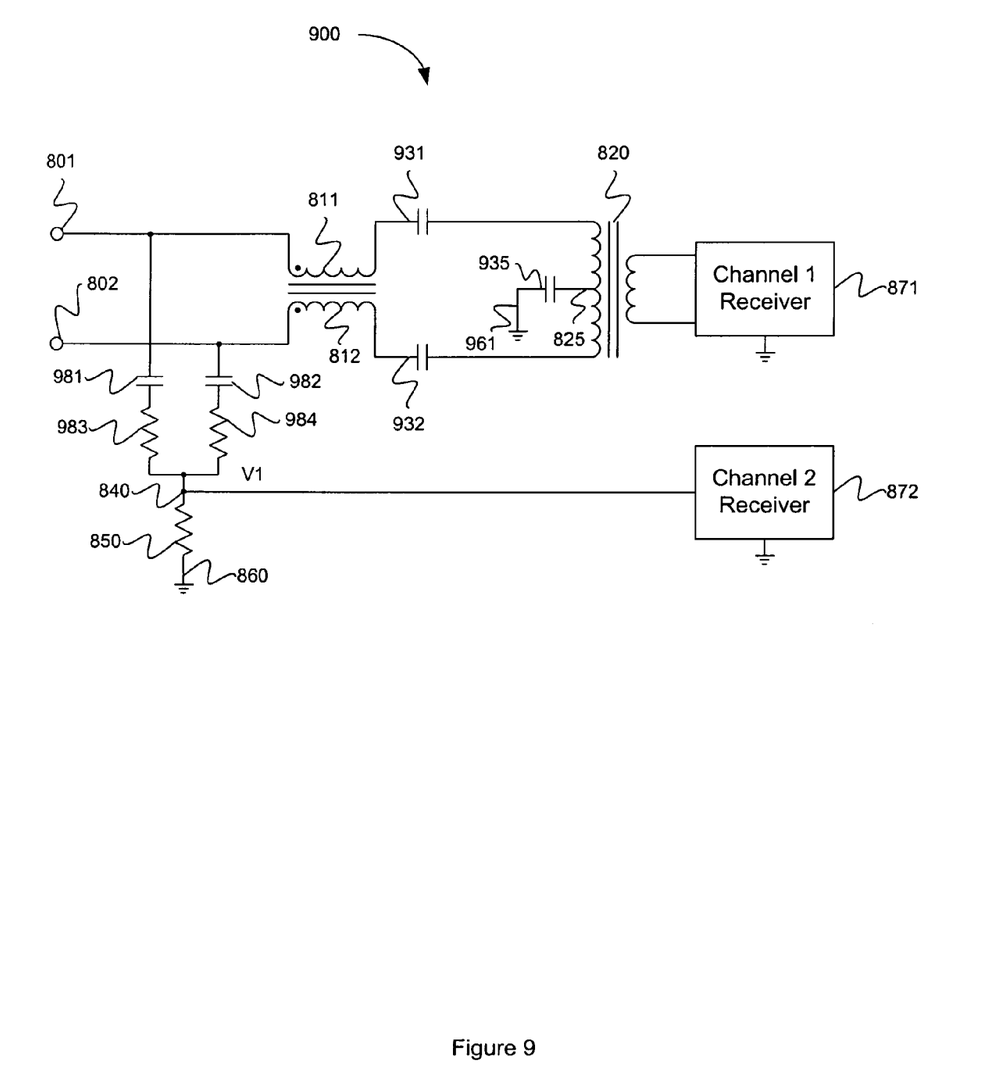
FIG. 9 illustrates a schematic diagram of a common-mode reference signal generation circuit according to one embodiment of the present invention.

FIG. 9 illustrates a schematic diagram of a common-mode reference signal generation circuit according to one embodiment of the present invention. Circuit 900 is substantially similar to circuit 800 of FIG. 8 except for the addition of DC blocking capacitors 931 and 932, center tap capacitor 935 in place of center tap potential feed circuit 830 and isolation capacitors 981 and 982 and matched resistors 983 and 984 in place of instant averager circuit 880. The first DC blocking capacitor 931 is coupled between the first series winding 811 and the input winding of transformer 820. Similarly, the second DC blocking capacitor 932 is coupled between the second series winding 912 and the input winding of transformer 820. The center tap capacitor 935 is coupled between the center tap 825 and low supply node 961. In this embodiment low supply node 961 has a ground potential, however in alternative embodiments, low potential node 961 has some other low potential value.

In this embodiment, the first isolation capacitor 981 is coupled to input line 801 and the second isolation capacitor 982 is coupled to input line 802. The first matched resistor 983 is coupled between isolation capacitor 981 and output node 840 and the second matched resistor 984 is coupled between isolation capacitor 982 and output node 840. In this embodiment, matched resistors 983 and 984 have resistance values in a range of approximately 5,000 ohms to 10,000 ohms and are matched to within approximately 1%, allowing a common-mode to differential ratio of approximately 34 dB. In an alternative embodiment where matched resistors 983 and 984 are matched to within 0.1%, approximately 54 dB may be achieved. In another alternative embodiment, matched resistors 983 and 984 are matched to within some other threshold value. In an alternative embodiment, matched resistors 983 and 984 have some other resistance value. In this embodiment, isolation capacitors 981 and 982 have a capacitance value of approximately 100 pF and are safety-class capacitors that span the TNV-to-SELV barrier and provide isolation. In an alternative embodiment, isolation capacitors 981 and 982 have some other capacitance value. Since isolation capacitor 981 and matched resistor 983 and isolation capacitor 982 and matched resistor 984 are coupled in series, in an alternative embodiment, the order is reversed. In other words, matched resistors 983 and 984 are coupled to input lines 801 and 802 respectively with isolation capacitors 981 and 982 coupled between matched resistors 983 and 984 and output node 840.

In this embodiment, shunt resistor 850 has a resistance in approximately a range of 10 ohms to 1000 ohms. In an alternative embodiment, shunt resistor 850 has some other resistance value. Shunt resistor 850, together with matched resistors 983 and 984, form a summer with respect to ground which contains the common-mode information. The summer, along with isolation capacitors 981 and 982 form an attenuator that scales the common-mode signal to approximately −30 dB. The common-mode filter formed by the components of the instant averager circuit has relatively high impedance for xDSL frequencies. As a result, no differential loading effects are suffered. Due to the relative high impedance of capacitors 981 and 982 with respect to voice-band frequencies, a required voice-band common mode balance of greater than 60 dB is maintained.

In the operation of circuit 900, the common-mode current is filtered by isolation capacitors 981 and 982 and matched resistors 983 and 984. The filtered common-mode current is then applied to shunt resistor 850 and the voltage at output node 840 is sampled. The voltage signal V1 at output node 840 is provided to the second receiver 872 as described above with respect to FIG. 8.

Figure 10:
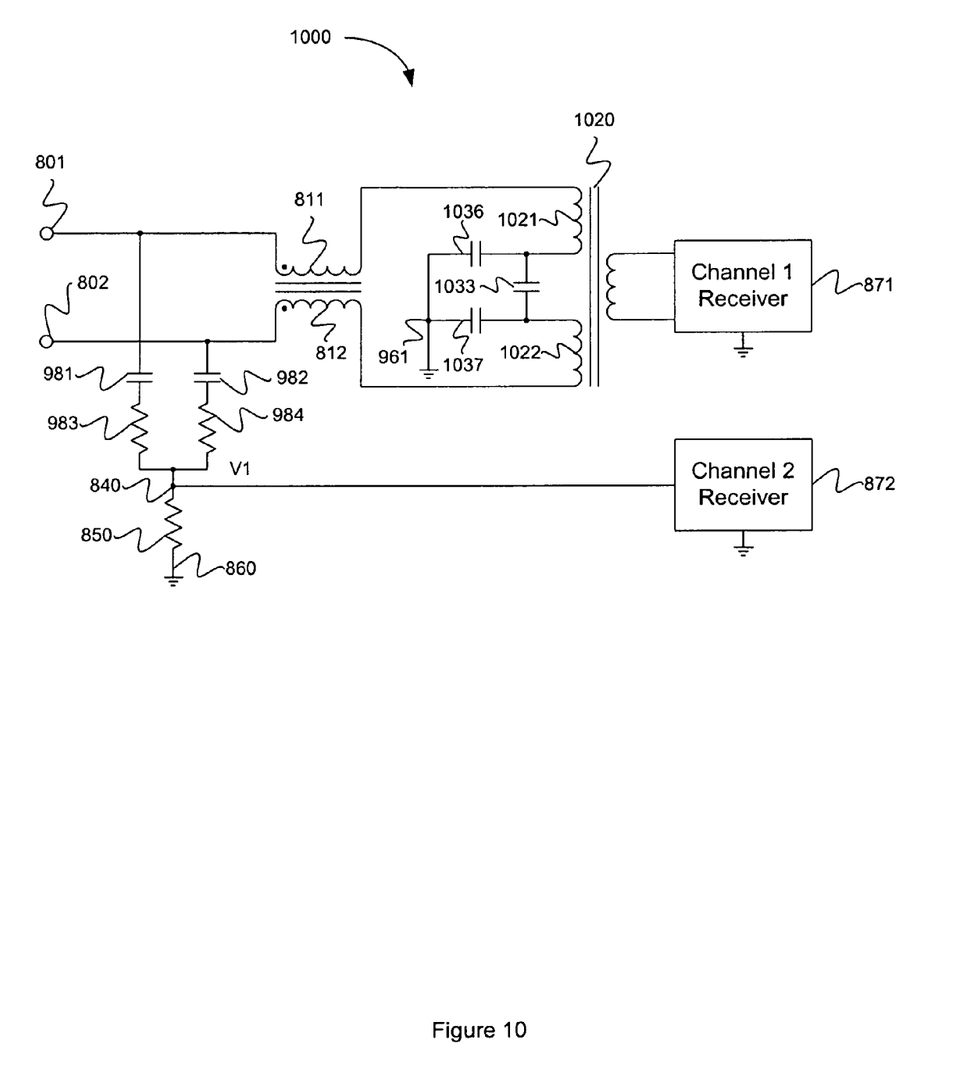
FIG. 10 illustrates a schematic diagram of a common-mode reference signal generation circuit according to one embodiment of the present invention.

FIG. 10 illustrates a schematic diagram of a common-mode reference signal generation circuit according to one embodiment of the present invention. Circuit 10 is substantially similar to circuit 900 of FIG. 9 except that the components of the center tap potential feed circuit are coupled between a first primary winding 1021 and a second primary winding 1022 on an input side of transformer 1020. In this embodiment, center tap potential feed circuit is made up of DC blocking capacitor 1033 and center tap capacitors 1036 and 1037. DC blocking capacitor 1033 is coupled between the first primary winding 1021 and the second primary winding of transformer 1020. Center tap capacitor 1036 is coupled between the first primary winding 1021 and low supply node 961 and center tap capacitor 1037 is coupled between the second primary winding 1022 and low supply node 961. The components of the center tap potential feed circuit serve to dump the common-mode energy of the received input signals to ground. Absence of the center tap potential feed circuit would result in excess common-mode energy leaking across transformer 1020 to receiver 872.

The operation of circuit 1000 is substantially similar to that discussed above regarding circuit 900 of FIG. 9. The common-mode current is filtered by isolation capacitors 981 and 982 and matched resistors 983 and 984. The filtered common-mode current is then applied to shunt resistor 850 and the voltage at output node 840 is sampled. The voltage signal V1 at output node 840 is provided to the second receiver 872.

Figure 11:
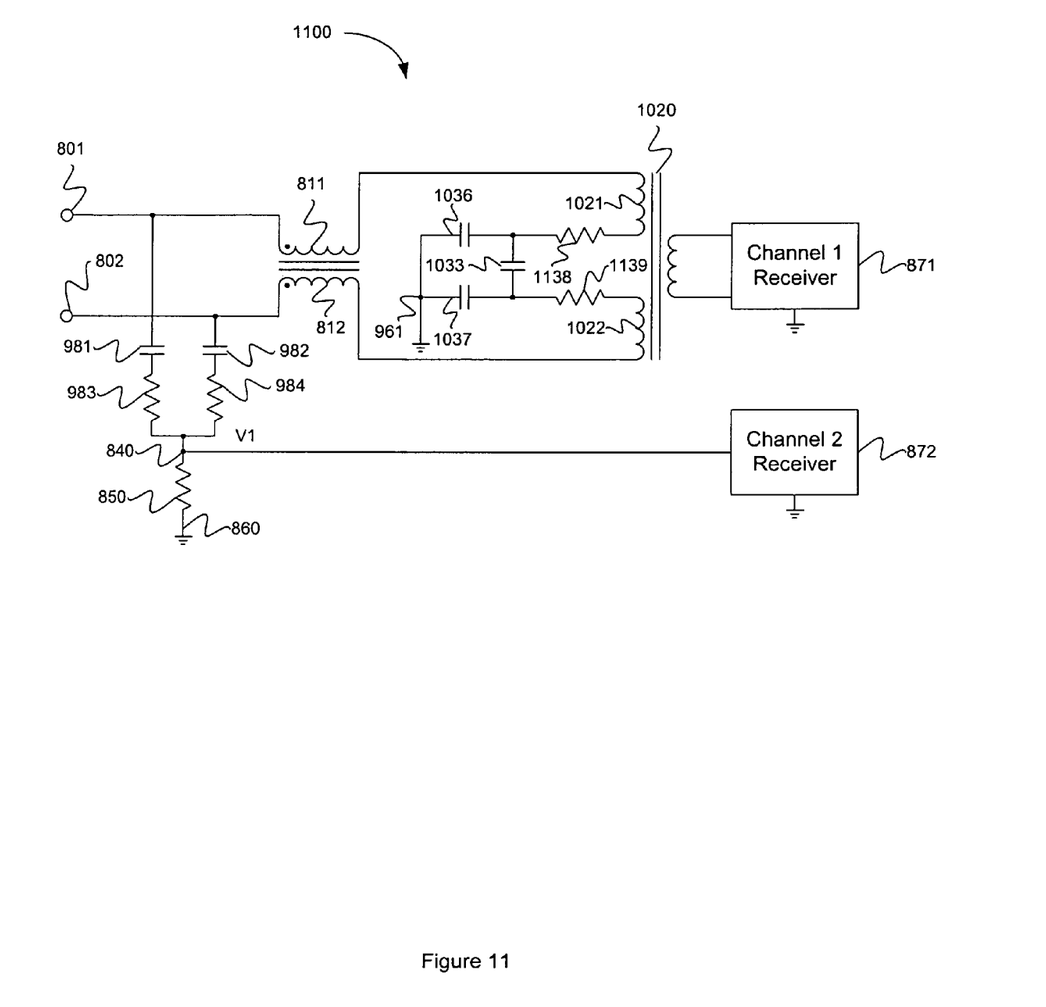
FIG. 11 illustrates a schematic diagram of a common-mode reference signal generation circuit according to one embodiment of the present invention.

FIG. 11 illustrates a schematic diagram of a common-mode reference signal generation circuit according to one embodiment of the present invention. Circuit 1100 is substantially similar to circuit 1000 of FIG. 10 with the addition of differential impedance matching resistors 1138 and 1139. A first differential impedance matching resistor 1138 is coupled between the first primary winding 1021 and the first center tap capacitor 1036. A second differential impedance matching resistor 1139 is coupled between the second primary winding 1022 and the second center tap capacitor 1037.

In an alternative embodiment, the differential impedance matching resistors are located on the output side of the transformer 1020. In either embodiment, the operation of the circuit is the same. The filtered common-mode current is applied to shunt resistor 850 and the voltage at output node 840 is sampled. The voltage signal V1 at output node 840 is provided to the second receiver 872.

Figure 12:
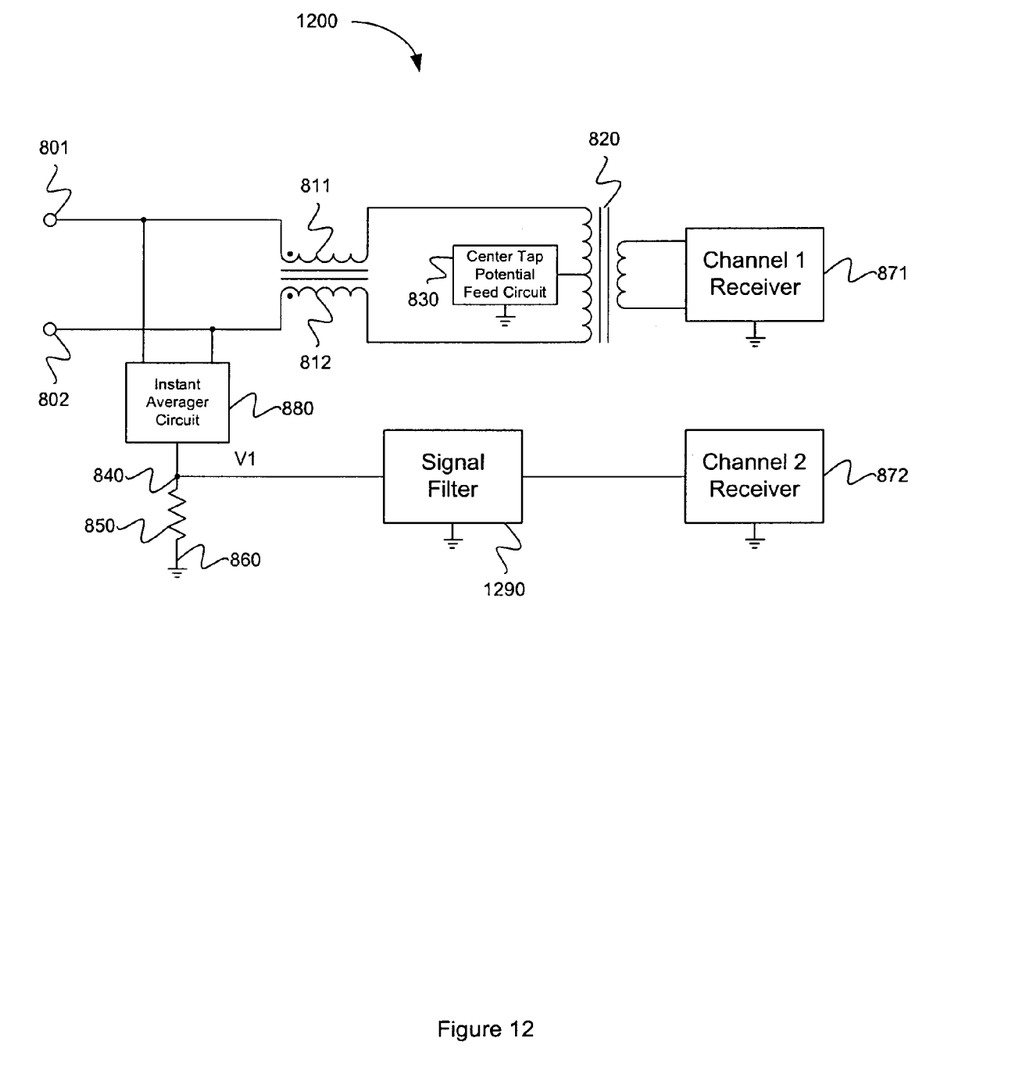
FIG. 12 illustrates a schematic block diagram of a common-mode reference signal generation circuit according to one embodiment of the present invention.

FIG. 12 illustrates a schematic block diagram of a common-mode reference signal generation circuit according to one embodiment of the present invention. Circuit 1200 is substantially similar to circuit 800 of FIG. 8 with the addition of signal filter 1290. Signal filter 1290 is coupled between output node 840 and receiver 872. Signal filter 1290 may be a low-pass filter, band-pass filter, or other filter type. In one embodiment, signal filter 1290 is a second order filter with roll-off starting at approximately 5 MHz. The common-mode reference signal V1 is applied to signal filter 1290 so as to reduce high frequency content. Signal filter 1290 serves to prevent aliasing in the signal and overloading of receiver 872.

Some portions of the above description are presented in terms of algorithms and symbolic representations of operations on data that may be stored within a memory and operated on by a processor. These algorithmic descriptions and representations are the means used by those skilled in the art to effectively convey their work. An algorithm is generally conceived to be a self-consistent sequence of acts leading to a desired result. The acts are those requiring manipulation of quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, parameters, or the like.

The above description includes several modules which may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software.

In one embodiment, the methods described above may be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, or any type of media suitable for storing electronic instructions. The information representing the apparatuses and/or methods stored on the machine-readable medium may be used in the process of creating the apparatuses and/or methods described herein.

While some specific embodiments of the invention have been shown the invention is not to be limited to these embodiments. The invention is to be understood as not limited by the specific embodiments described herein, but only by the scope of the appended claims.

What is claimed is:

1. An apparatus comprising:
   a common-mode current sensing circuit configured to receive a common-mode current, the common-mode current sensing circuit comprises a center tap potential feed circuit and receives the common-mode current from a transformer having an input side and an output side;
   a shunt resistor coupled between the common-mode current sensing circuit and a first low supply node;
   the transformer has a first primary winding and a second primary winding on the input side, and wherein the center tap potential feed circuit is coupled between the first primary winding and the second primary winding; and
   wherein the center tap potential feed circuit comprises:
   one or more components providing a first differential impedance matching resistance located between and coupled to the first primary winding and a first node;
   one or more components providing a second differential matching resistance located between and coupled to the second primary winding and a second node;
   one or more components providing a DC blocking capacitance between the first node and the second node;
   a first center tap capacitance coupled to the first node; and
   a second center tap capacitance coupled to the second node.

2. The apparatus of claim 1, further comprising:
   a first series winding coupled to the first primary winding of the transformer and configured to receive a first input signal; and
   a second series winding coupled to the second primary winding of the transformer and configured to receive a second input signal.

3. The apparatus of claim 1, further comprising:
   a first receiver coupled to the output side of the transformer; and
   a second receiver coupled to a node between the center tap potential feed circuit and the shunt resistor.

4. The apparatus of claim 1, wherein the shunt resistor has a resistance in approximately a range of 10 ohms to 500 ohms.

5. An apparatus comprising:
   means for receiving a common-mode current; and
   means for generating a common-mode reference signal from the common-mode current via a common-mode current sensing circuit which comprises a center tap potential feed circuit and receives the common-mode current from a transformer having an input side and an output side;
   the transformer has a first primary winding and a second primary winding on the input side, and wherein the center tap potential feed circuit is coupled between the first primary winding and the second primary winding; and wherein the center tap potential feed circuit comprises:
   one or more components providing a first differential impedance matching resistance located between and coupled to the first primary winding and a first node;
   one or more components providing a second differential impedance matching resistance located between and coupled to the second primary winding and a second node;
   one or more components providing a DC blocking capacitance between the first node and the second node;
   a first center tap capacitance coupled to the first node; and
   a second center tap capacitance coupled to the second node.

6. The apparatus of claim 5, wherein the means for generating the common-mode reference signal comprises a means for sampling the common-mode current at a node between a common-mode current sensing circuit and a shunt resistor.

7. The apparatus of claim 6, wherein the shunt resistor is coupled to a low supply node.

8. The apparatus of claim 6, further comprising:
   means for providing the common-mode reference signal to a receiver.

* * * * *